United States Patent
Riddel et al.

(10) Patent No.: US 9,438,507 B2
(45) Date of Patent: Sep. 6, 2016

(54) ROUTING AGGREGATION AND PREFIX DELEGATION

(71) Applicant: CISCO TECHNOLOGY, INC., San Jose, CA (US)

(72) Inventors: Jeffrey Riddel, Cary, NC (US);
Srinivasa Neppalli, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 13/907,047

(22) Filed: May 31, 2013

(65) Prior Publication Data

US 2014/0355609 A1    Dec. 4, 2014

(51) Int. Cl.
*H04L 12/28* (2006.01)
*H04L 12/751* (2013.01)
*H04L 1/16* (2006.01)

(52) U.S. Cl.
CPC ..................... *H04L 45/02* (2013.01)

(58) Field of Classification Search
USPC .................. 370/252, 329, 389, 401, 386
See application file for complete search history.

(56) References Cited

U.S. PATENT DOCUMENTS

| 7,454,519 | B2 | 11/2008 | Smith et al. |
| 8,223,666 | B2 | 7/2012 | Jarvis et al. |
| 8,369,329 | B2 | 2/2013 | Koehler, Jr. et al. |
| 2006/0159100 | A1* | 7/2006 | Droms ................ H04L 12/2801 370/395.2 |
| 2010/0142410 | A1* | 6/2010 | Huynh Van ......... H04L 12/4633 370/255 |

FOREIGN PATENT DOCUMENTS

| EP | 1520393 | 11/2007 |
| EP | 2461547 | 6/2012 |
| WO | 03007556 | 1/2003 |
| WO | 03084147 | 10/2003 |
| WO | 2006124809 | 11/2006 |

* cited by examiner

*Primary Examiner* — John Pezzlo
(74) *Attorney, Agent, or Firm* — Merchant & Gould P.C.

(57) ABSTRACT

One embodiment of the invention includes a method for prefix delegation to a customer premises equipment (CPE) device in a network system. The method includes receiving a dynamic host configuration protocol (DHCP) request that is generated at the CPE device. The address request can include an interface identifier associated with a network topology of the CPE device. The method also includes delegating a prefix for the CPE device in response to the address request, the delegated prefix corresponding to a subnet assignment for the CPE device based on the interface identifier in the address request. The method further includes transmitting the prefix to the CPE device in a response packet, and setting a route aggregation scheme for data routed to the endpoint device based on the delegated prefix.

10 Claims, 4 Drawing Sheets

ROUTING AGGREGATION AND PREFIX DELEGATION

TECHNICAL FIELD

This disclosure relates to routing aggregation and prefix delegation.

BACKGROUND

As network address space becomes closer to exhaustion, new network protocols and address dissemination techniques are being implemented. For example, IPv6 devices are becoming increasingly more deployed as IPv4 network space is rapidly diminishing. A given termination system, such as a cable modem termination system, can connect thousands of devices to a multi-system operator (MSO) network, with each such device requiring a network address and a portion of network bandwidth. Thus, in order to substantially minimize the size of routing updates and to mitigate the impact on processing and memory resources, aggregate routing techniques can be implemented to handle routing of data to the devices on the network.

DESCRIPTION OF EXAMPLE EMBODIMENTS

Overview

This disclosure relates generally to network systems, and specifically to routing aggregation and prefix delegation. In a network system, such as a cable network, one or more endpoint devices (e.g., customer premises equipment devices) can generate an address request (e.g., dynamic host configuration protocol (DHCP) request) in a provisioning process to obtain an IP address. The address request can be an IPv6 address request, for example. The address request can be provided to a provisioning system, such as via a termination system (e.g., a cable modem termination system). The address request can be provided with an interface identifier that can be associated with network topology data, such as including a physical device address and/or data associated with a common topology of at least a portion of the EP devices in a given service group. As an example, the interface identifier can be added to the address request by a relay agent of the termination system. The provisioning system can thus delegate a prefix for the EP device that is provided to the EP device via a response packet. The prefix can be delegated based on the interface identifier, such that the prefix can correspond to an appropriate subnet for the EP device based on the network topology data. As a result, packets can be routed to the EP devices in a given service group in an aggregate and scalable manner.

In addition to the delegation of the prefixes, the provisioning system can take an active role in aggregate routing based on setting a route aggregation scheme and updating routing tables associated with aggregate routers and termination systems during the provisioning process. For example, the provisioning system can delegate prefixes for EP devices from common prefix blocks to maintain scalable route aggregation. Upon delegating a first prefix from a given prefix block, the provisioning system can set a route aggregation scheme for all such prefixes to be delegated from the block. However, based on previous delegations of prefixes and subsequent address requests, the provisioning system can determine if an EP device has moved from one termination system to another in a given network, and can determine if node splitting has occurred. If the provisioning system determines if all of the EP devices have moved from one termination system to another, the provisioning system sets a new route aggregation scheme for all of the devices associated with the termination system. Otherwise, the provisioning system can set a specific routing scheme for the specific EP device. The provisioning system can then update all of the associated routing tables of the aggregate routers and termination systems to reflect the route aggregation and/or specific routing scheme(s).

Example Embodiments

Figure 1:
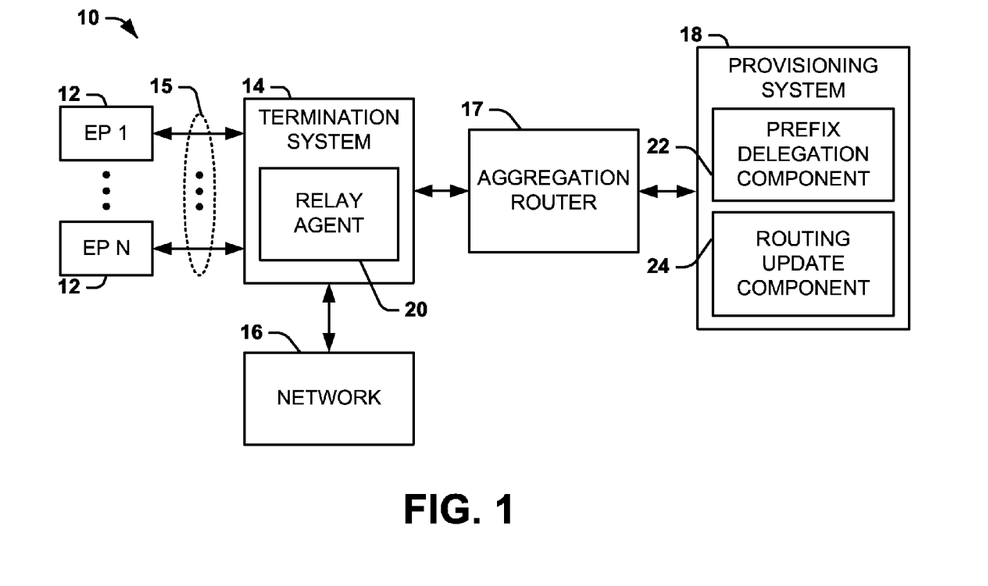
FIG. 1 illustrates an example of a network system.

FIG. 1 illustrates an example of a network system 10. The network system 10 can be configured as any of a variety of networks, such as a Hybrid Fiber Coaxial (HFC) cable access network. The network system 10 includes a plurality N of endpoint (EP) devices 12, where N is a positive integer. As an example, the EP devices 12 can be implemented as customer premises equipment (CPE) devices, which can be configured as IPv6-capable devices in a cable network system. As described herein, the term "EP device" refers to a local routing device (e.g., an IPv6 router) located at a customer administrator domain or other endpoint domain that is to be coupled to a network, as well as associated customer-premises network and computer equipment that is configured to connect the computing device itself to a local area network (LAN) and/or the Internet. Thus, a given EP device 12, as described herein, can include a local router, a network bridge, a modem, a wireless transmitter/receiver, a set top box, and/or a combination of other customer-premises devices for coupling a local area network (LAN) or other computer devices to the network system 10 via the EP device 12.

The EP devices 12 are each coupled to a termination system 14. As described herein, devices on the network system 10 are "coupled" or "connected" based on communicative connectivity between the devices via the network, schematically demonstrated at 15. For example, the EP devices 12 can be located at one or more different customer-premises locations, while the termination system 14 can be located at a multi-system operator (MSO) location (i.e., a service-provider premises). In the context of a cable network system, for instance, the termination system 14 can include one or more cable modem termination systems (CMTS) that may reside at a headend of a cable distribution plant for an MSO. The termination system 14 can be configured as a router to connect the respective EP devices 12 to a network, demonstrated in the example of FIG. 1 at 16, such as a local area network (LAN) or a wide area network (WAN). As an example, the network 16 could be the Internet. The network system 10 also includes an aggregation router 17 that interconnects the termination system 14 and a provisioning system 18. The provisioning system 18 could likewise be located at the MSO location, and is configured to communicate with the termination system 14 via the aggregation router. As an example, the provisioning system 18 can be arranged as an enterprise server or collection of servers that are configured to delegate prefixes to the EP devices 12 during a provisioning process, such that the EP devices 12 can be assigned respective network addresses based on the delegated prefixes. In some examples, the provisioning system 18 can be configured to delegate IPv6 prefixes, such that the termination system 14 and/or a gateway router can assign respective IPv6 addresses to each of the EP devices 12.

By way of example, as part of prefix delegation, a given EP device 12 can generate an address request, such as a dynamic host configuration protocol (DHCP) request. The address request is packetized and transmitted to the provisioning system 18 via the termination system 14. In the example of FIG. 1, the termination system 14 includes a relay agent 20. The relay agent 20 is configured to identify network topology characteristics associated with the EP device 12 and to generate an interface identifier for the EP device 12 based on the network topology characteristics. For example, the network topology characteristics of the EP device 12 can include physical network topology characteristics, such as any or all of a hardware network address of the EP device 12 (e.g., a media access control (MAC) address), a service group with which the EP device 12 is associated, network node characteristics, and/or common network topology characteristics of at least a portion of the EP devices 12. The relay agent 20 can associate the interface identifier with the address request based on the identified network topology characteristics. For example, the relay agent can insert or otherwise attach the interface identifier into the address request. As a result, the address request including the interface identifier can be provided to the provisioning system 18.

Figure 2:
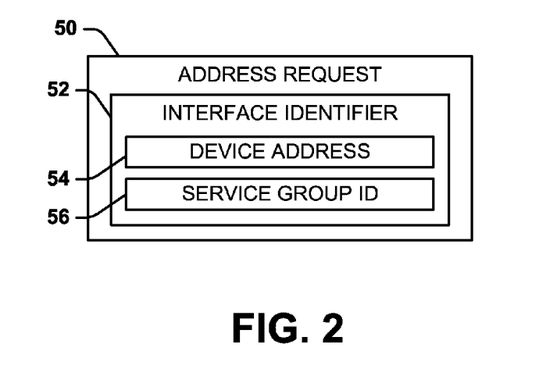
FIG. 2 illustrates an example of a dynamic host configuration protocol request.

FIG. 2 illustrates an example of an address request 50. The address request 50 can correspond to one or more data packets that are transmitted from a respective one of the EP devices 12 to request a network address, such as an IPv6 address. For example, the address request 50 can be provided as a DHCP request. The address request 50 can include a variety of data that can correspond to the data that is sufficient for the delegation of a prefix, and thus the assignment of a network address. For example, the address request 50 can include addresses (e.g., link and/or peer addresses), hop counts, network specific data, and/or vendor specific data. In addition, the address request 50 includes an interface identifier 52.

In the example of FIG. 2, the interface identifier 52 includes a device address 54, such as corresponding to a physical address of the respective EP device 12 (e.g., MAC address), and a service group identifier 56. The service group identifier 56 can correspond to a service group in which the EP device 12 is included, such as a Data Over Cable Service Interface Specification (DOCSIS) group, such as described by the CableLabs DOCSIS specifications. A service group of EP devices 12 can be grouped according to a physical topology (e.g., the spatial location of the EP devices) and/or a logical topology (e.g., according to how the EP devices communicate). As an example, all of or a proper subset of the EP devices 12 can be included in the same service group, and thus all such grouped EP devices can have a common service group identifier 56. The interface identifier 52 could also include additional network topology data. As described previously, the interface identifier 52 could be inserted into or otherwise attached to the address request 50 by the relay agent 20 in the termination system 22. In other examples, the interface identifier 52 could be associated with the respective address request 50 by other components on the network system 10, such as the EP device 12 that generated the address request.

Referring back to the example of FIG. 1, the provisioning system 18 includes a prefix delegation component 22. The prefix delegation component 22 is configured to delegate a prefix to the EP device 12 that initiated the address request 50. The prefix can be delegated based on the interface identifier 52 to ensure that the respective EP device 12 is assigned a network address in a given subnet of network address space (e.g., IPv6 address space) that is associated with the common physical topology of the respective other EP devices 12. For example, the EP device 12 can be delegated a prefix that corresponds to a common service group identifier (e.g., the service group identifier 56) of other EP devices 12. As another example, the EP device 12 can be delegated a prefix based on a service type with respect to data provided to the EP device 12 (e.g., video, audio, data streaming, etc.), indications of the type of device corresponding to the EP device 12 (e.g., such as provided in the MAC address), logical groupings of the EP device 12 with other EP devices, and/or other factors. As a result, data can be aggregately routed by the aggregate router 17 in a scalable manner to the EP devices 12 based on having been delegated a prefix based on the interface identifier 52, and thus based on the network topology information therein. Accordingly, the prefix delegation component 22 intelligently assigns and delegates the prefix to provide for aggregate routing while maintaining prefix stability, as disclosed herein. The prefix is thus transmitted to the EP device 12 that initiated the address request 50, such that the EP device 12 is assigned an address based on the prefix (e.g., using StateLess Address AutoConfiguration (SLAAC)).

The provisioning system 18 can also include a routing update component 24. The routing update component 24 is configured to set a route aggregation scheme based on the delegated prefixes. For example, the routing update component 24 can advertise the route aggregation scheme to the aggregate router 17 and other devices on the network (e.g., using a Border Gateway Protocol (BGP) or using an Interior Gateway Protocol (IGP)). For example, the routing update component 24 can advertise the route aggregation scheme to the aggregation router 17, the termination system 14, and one or more additional termination systems 14, such as each being connected to a plurality of additional EP devices 12. As a result, the respective other devices in the network system 10 can update respective routing tables based on the advertised route aggregation scheme. In addition, as disclosed herein, the routing update component 24 can be configured to detect if one or more of the EP devices 12 are moved from the termination system 14 to a different termination system. As described herein, an EP device 12 is described as having moved when it changes its coupling from one termination system to another. In response to the movement of the EP device(s) 12, the routing update component 24 can be configured to automatically change the route aggregation scheme to reflect the change. As a result, tedious manual modification to the routing tables of the respective other devices in the network system 10 can be substantially mitigated and/or alleviated.

Figure 3:
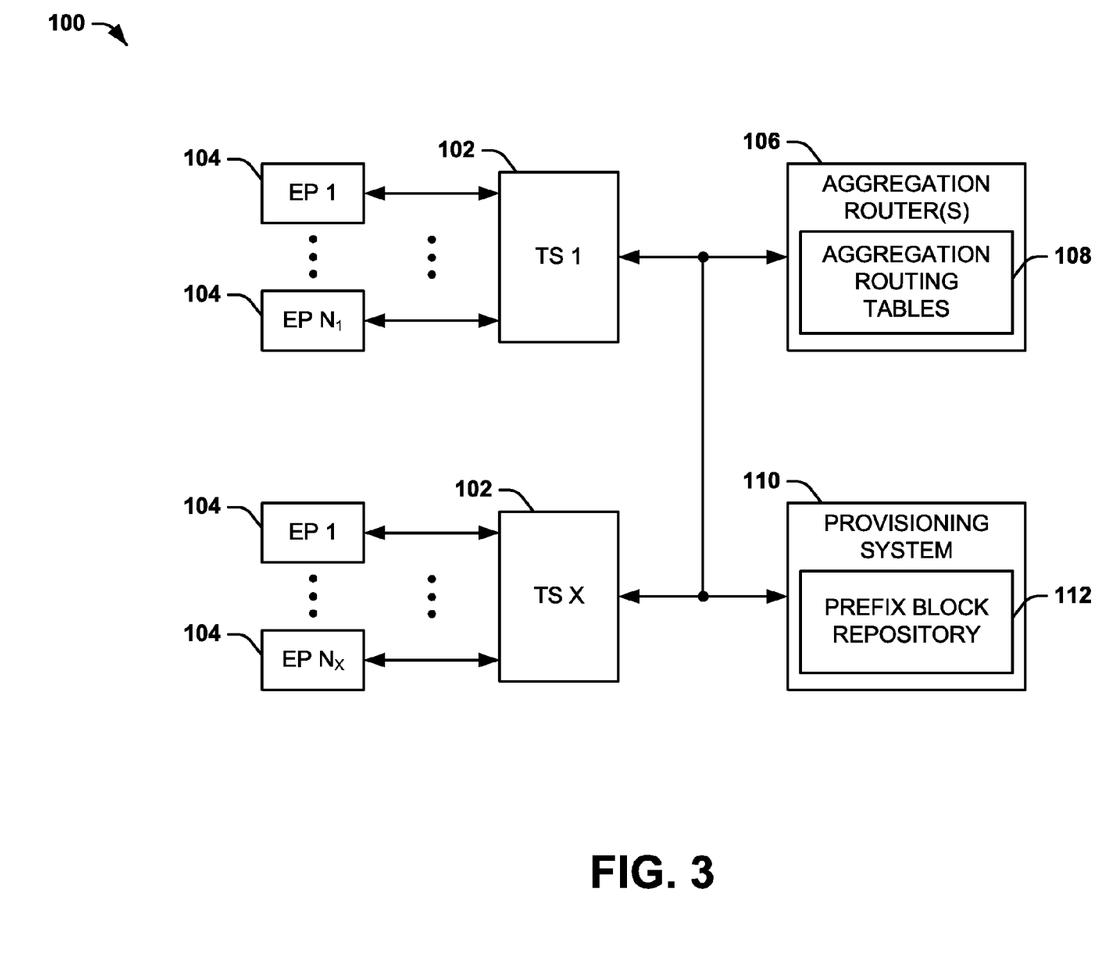
FIG. 3 illustrates another example of a network system.

FIG. 3 illustrates another example of a network system 100. The network system 100 can be configured as any of a variety of networks, such as a cable network. The network system 100 includes a plurality X of termination systems 102, where X is a positive integer. Each of the plurality of termination systems 102 is connected to a plurality of EP devices 104, demonstrated in the example of FIG. 3 as $N_1$ and $N_X$, where $N_1$ and $N_X$ are positive integers denoting the number of EP devices 104 associated with each respective termination system 102. The quantities $N_1$ and $N_X$ need not be equal, such that the termination systems 102 can each be coupled to a distinct or equal number of EP devices 104 relative to each other. As an example, the EP devices 104 can be configured as IPv6-capable CPE devices.

The termination systems 102 can be configured, for example, as cable modem termination systems, and can be located at the same or separate physical locations (e.g., at a headend or hub of a CATV distribution plant). As an example, each of the termination systems 102 can be associated with a separate service group, such that the connected EP devices 104 can be coupled to the respective termination system 102 based on the service group association. Each of the termination systems 102 can include one or more routers configured to connect the respective EP devices 104 to the Internet or a variety of other networks, such that data can be routed to the EP devices 104, aggregately or individually. In the example of FIG. 3, the termination systems 102 are also coupled to one or more aggregate routers 106 that can implement aggregate routing of data to the EP devices 104. For example, the aggregate router(s) 106 can be configured as regional route reflectors (RR), and/or can be configured to implement BGP or IGP routing. The aggregate router(s) 106 are configured to maintain aggregation routing tables 108 that are associated with a route aggregation scheme, such that the aggregate routing of data to the EP devices 104 can be based on the route aggregation scheme data in the aggregation routing tables 108.

The network system 100 also includes a provisioning system 110 that can be arranged as an enterprise server or collection of servers. Similar to as described previously, the provisioning system 110 is configured to delegate prefixes to the EP devices 104 during a provisioning process, such that the EP devices 104 can be assigned respective network addresses based on the prefixes. For example, the respective one of the termination systems 102 to which an EP device 104 is coupled can insert (e.g., via relay agent 20 of FIG. 1) an interface identifier, such as the interface identifier 52 in the example of FIG. 2, into an address request that is initiated by the respective EP device 104. The interface identifier can include network topology characteristics associated with the EP device 104, such as including common topology characteristics associated with at least a portion of the EP devices 104 that are coupled to the termination system 102 (e.g., physical network topology characteristics). Thus, the provisioning system 110 can delegate (e.g., via prefix delegation component 22 of FIG. 1) a prefix to the EP device 104 that initiated the address request based on the interface identifier to ensure that the respective EP device 104 is assigned a network address in a given subnet of network address space based on the network topology.

The delegated prefix can be selected by the provisioning system 110 from a block of prefixes that correspond to the common physical topology of the EP devices 104. In the example of FIG. 3, the provisioning system 110 includes a prefix block memory 112 that is configured as a memory to store one or more blocks of prefixes to be delegated to the EP devices 104. The provisioning system 110 can thus associate the prefixes that are delegated to the EP devices 104 with the EP devices 104 themselves, such as in the prefix block memory 112. Therefore, the provisioning system 110 can implement the previous delegation of a prefix along with subsequent address requests to determine if one or more EP devices 104 have moved from one termination system 102 to another termination system 102, such as could result from a node split. As described herein, a node split is the network node relocation of all EP devices 104 from one termination system 102 to another termination system 102. In response to determining that one or more of the EP devices 104 have moved, the provisioning system 110 can set an updated route aggregation scheme and automatically advertise the updated route aggregation scheme to the other devices in the network system 100. Therefore, the aggregation router(s) 106 can update the respective aggregation routing tables 108, and the termination systems 102 can likewise update respective internal routing tables to account for the changes to the network system 100. Accordingly, the prefixes that define the aggregate routing of data to the EP devices 104 can remain stable, even when EP devices 104 are moved from one of the termination systems (e.g., TS 1) 102 to a different termination system (e.g., TS X) 102.

Figure 4:
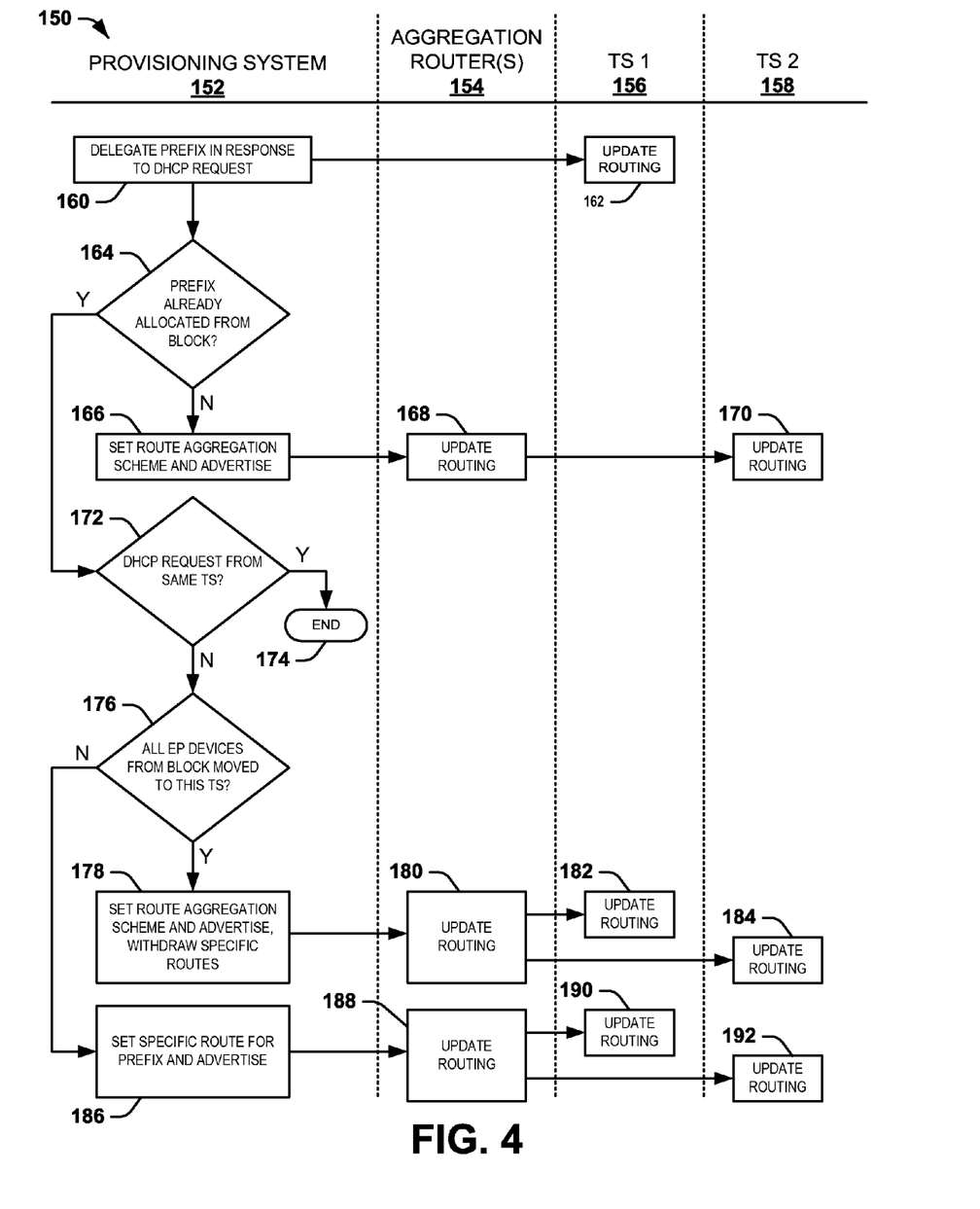
FIG. 4 illustrates an example of a signaling diagram of a provisioning method.

FIG. 4 illustrates an example of a signal diagram 150 for a provisioning method. The diagram 150 demonstrates how prefix stability is achieved in a network system in which route aggregation is established for routing data to a plurality of EP devices in an aggregate manner. The network system in which the method is implemented can correspond to the network system 10 or the network system 100, such as disclosed in the examples of FIGS. 1 and 3. Therefore, reference is to be made to the examples of FIGS. 1 and 3 in the following description of the example of FIG. 4.

The diagram 150 includes a column corresponding to functions that are performed by each different part of a network system, including a provisioning system 152 (e.g., the provisioning system 110 of FIG. 3), one or more aggregation routers 154 (e.g., the aggregation router(s) 106 of FIG. 3), a first termination system 156 (e.g., one of the termination systems 102 of FIG. 3) and another termination system 158 (e.g., another of the termination systems 102 of FIG. 3). The functions performed by each of the components are arranged in columns below the respective components. In the example of FIG. 4, the reference numbers of the columns will thus be used to identify the devices themselves. It is to be understood that the second termination system 158 is differentiated from the first termination system 156 based on the delegation of a prefix to an EP device 104 coupled to the first termination system 156, as described herein.

The method begins at 160, in which the provisioning system 152 delegates a prefix to an EP device 104 in response to an address request 50 in which the first termination system 156 inserted an interface identifier 52. Thus, at 162, the first termination system 156 updates routing tables to account for the delegated prefix.

At 164, the provisioning system 152 determines if a prefix had already been allocated from the prefix block (e.g., stored in the prefix block memory 112) from which the prefix had been delegated. In response to determining that a prefix had not previously been allocated from the prefix block (i.e., "N"), the method proceeds to 166. At 166, the provisioning system 152 sets a route aggregation scheme associated with the delegated prefix with respect to the first termination system 156 and advertises the route aggregation scheme (e.g., via a BGP routing update). At 168, the advertised route aggregation scheme is provided to the aggregation router(s) 154, and the aggregation router(s) 154 update the respective route aggregation tables 108. The aggregation router(s) 154 can then distribute the route aggregation scheme to the rest of the devices on the network system 100. Similarly, at 170, the advertised route aggregation scheme is provided to the second termination system 158 which likewise updates respective routing tables based on the advertised route aggregation scheme. The provisioning system 152 does not advertise this route aggregation scheme to the first termination system 156 because the first termination system 156 can already update its respective routing tables in response to receiving the prefix in the DHCP response packet from the provisioning system 152 at 162.

In response to determining at 164 that a prefix had previously been allocated from the prefix block (i.e., "Y"), the method proceeds to 172 in which the provisioning system 152 determines if the address request 50 associated with the delegated prefix is from the same termination system 102 as the termination system 102 that had forwarded the previous address request 50 that resulted in the previously delegated prefix allocated from the same prefix block. If the provisioning system 152 determines that the address request is from the same termination system 102 as the previous address request (i.e., "Y"), then no further action is necessary, and the method ends at 174. However, if the provisioning system 152 determines that the address request is not from the same termination system 102 as the previous address request (i.e., "N"), then the provisioning system 152 determines that one or more of the EP devices 104 has moved from one termination system 102 to another termination system 102, and the method proceeds to 176.

At 176, the provisioning system 152 determines if all of the EP devices 104 having been delegated prefixes from the prefix block have moved to the same termination system 102, such that the given EP device is the last of the EP devices 104 to have been moved to the respective termination system 102. If the provisioning system 152 determines that the given EP device is the last of the EP devices 104 to have been moved to the respective termination system 102 (i.e., "Y"), then the provisioning system 152 concludes that a node split had occurred. In response, at 178, the provisioning system 152 sets a route aggregation scheme with respect to the prefix block based on the determined node split and advertises the route aggregation scheme (e.g., via a BGP routing update). The provisioning system 152 also withdraws any specific route schemes associated with the EP device 104 having been delegated the prefix at 178 based on the imminent update of the route aggregation tables 108 associated with the aggregation router(s) 154. At 180, the advertised route aggregation scheme is provided to the aggregation router(s) 154, and the aggregation router(s) 154 update the respective route aggregation tables 108. The aggregation router(s) 154 can then distribute the route aggregation scheme to the rest of the devices on the network system 100. Similarly, at 182, the advertised route aggregation scheme is provided to the first termination system 156, and at 184, the advertised route aggregation scheme is provided to the second termination system 158, which each likewise update respective routing tables based on the advertised route aggregation scheme.

In the event of a node split, it may take some time for all of the EP devices 104 to re-register (e.g., initiate address requests) when coupled to the new termination system 102. Thus, the provisioning system 152 can account for this by allowing for some time delay (e.g., a predetermined amount of delay) before implementing the determination at 176. In addition or alternatively, the provisioning system 152 can initiate a connectivity check for non-registered EP devices 104 to determine if they are still active in the network system 100. It the provisioning system 152 determines a lack of connectivity of one or more of the EP devices 104, then the provisioning system 152 can have determined that a node split has occurred despite the lack of registration of the some of the EP devices 104 on the new termination system 102.

If the provisioning system 152 determines that the given EP device is not the last of the EP devices 104 to have been moved to the respective termination system 102 (i.e., "N"), then the provisioning system 152 concludes only a proper subset of the EP devices 104 that were delegated from the prefix block have moved. In response, at 186, the provisioning system 152 sets a specific route scheme with respect to the EP device 104 having been delegated the prefix and advertises the specific route scheme (e.g., via a BGP routing update). At 188, the advertised specific route scheme is provided to the aggregation router(s) 154, and the aggregation router(s) 154 update the respective route aggregation tables 108. The aggregation router(s) 154 can then distribute the specific route scheme for the delegated prefix to the rest of the devices on the network system 100. Similarly, at 190, the advertised specific route scheme is provided to the first termination system 156, and at 192, the advertised specific route scheme is provided to the second termination system 158, which each likewise update respective routing tables based on the advertised specific route scheme.

Therefore, the method of the diagram 150 in the example of FIG. 4 demonstrates a manner in which route aggregation for data to the EP devices 104 can be implemented while prefix stability can be maintained. In other words, the provisioning system 152 can intelligently delegate prefixes to the EP devices 104 based on the network topology of the EP devices 104, and can automatically maintain prefix stability with respect to aggregate routing of data to the EP devices 104, such that changes to the connectivity of the EP devices 104 on the network system 100 can be substantially automatically accounted. Accordingly, tedious manual updates to route aggregation in the network system 100 can be substantially mitigated.

Figure 5:
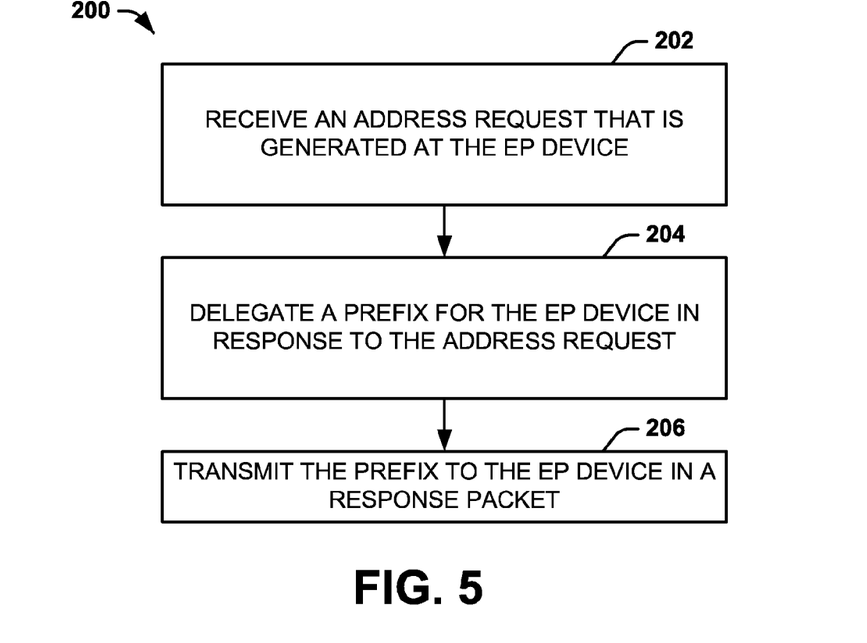
FIG. 5 illustrates an example of a method for providing a prefix delegation to a device in a network system.
Figure 6:
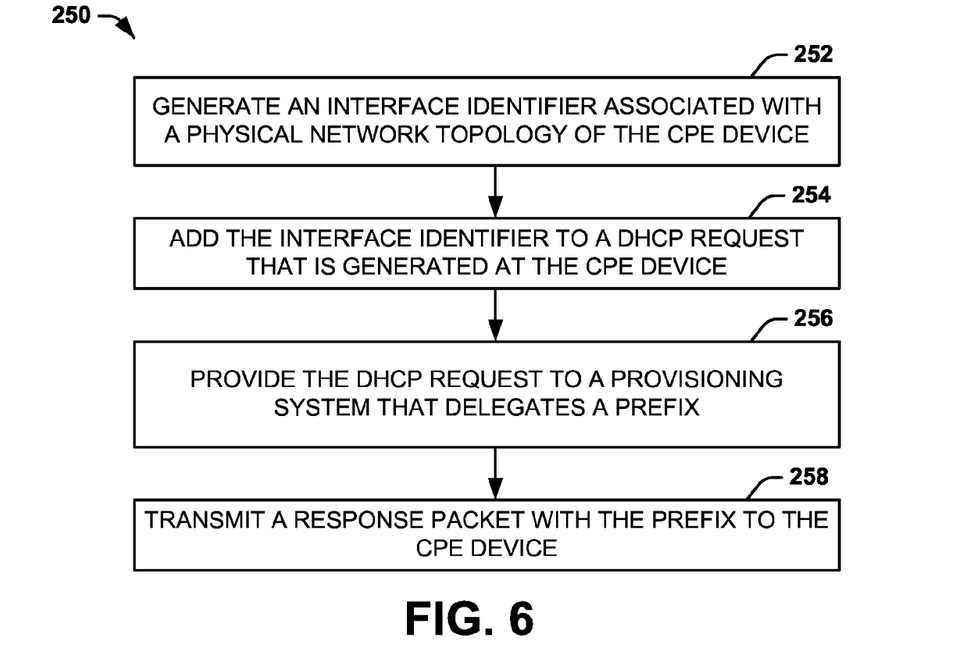
FIG. 6 illustrates an example of a method for providing a prefix delegation to a device in a network system.

In view of the foregoing structural and functional features described above, a method in accordance with various aspects of the present invention will be better appreciated with reference to FIGS. 5 and 6. While, for purposes of simplicity of explanation, the methods of FIGS. 5 and 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device, for example.

FIG. 5 illustrates an example of a method 200 for prefix delegation to an EP device (e.g., the EP device 12) in a network system (e.g., the network system 10). At 202, an address request (e.g., the address request 50) that is generated at the EP device is received, the address request comprising an interface identifier (e.g., the interface identifier 52) associated with a network topology (e.g., the device address 54 and/or the service group identifier 56) of the EP device. At 204, a prefix for the EP device is delegated (e.g., by the provisioning system 18) in response to the address request, the delegated prefix corresponding to a subnet assignment for the EP device based on the interface identifier in the address request. At 206, the prefix is transmitted to the EP device in a response packet.

FIG. 6 illustrates an example of a method 250 for prefix delegation to a CPE device (e.g., the EP device 12) in a network system (e.g., the network system 10). At 252, an interface identifier (e.g., the interface identifier 52) associated with a network topology (e.g., the device address 54 and/or the service group identifier 56) of the CPE device is generated. At 254, the interface identifier is added to an address request (e.g., the address request 50) that is generated at the CPE device. At 256, the address request including the interface identifier is provided to a provisioning system (e.g., the provisioning system 18) that delegates a prefix based on the interface identifier in response to the address request. At 258, a response packet that includes the prefix is transmitted to the CPE device via a termination system.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
   receiving an address request that is generated at an endpoint device in a network system, the address request comprising an interface identifier associated with a network topology of the endpoint device, wherein receiving the address request comprises receiving the address request from one of a plurality of termination systems, each of the plurality of termination systems being coupled to a plurality of endpoint devices that are each associated with a given service group;
   delegating a prefix for the endpoint device in response to the address request, the delegated prefix corresponding to a subnet assignment for the CPE device based on the interface identifier in the address request;
   transmitting the prefix to the endpoint device in a response packet;
   setting a route aggregation scheme for data routed to the endpoint device based on the delegated prefix, wherein setting the route aggregation scheme comprises setting the route aggregation scheme at a provisioning system for data routed to the plurality of endpoint devices based on a prefix that is delegated to each of the plurality of termination systems and wherein setting the route aggregation scheme comprises setting the route aggregation scheme in response to determining that the delegated prefix associated with one of the plurality of endpoint devices coupled to a first of the plurality of termination systems is a first in a block of prefixes to have been delegated; and
   providing the route aggregation scheme to an aggregation router and to a remaining at least one of the plurality of termination systems for an update of respective routing tables.

2. The method of claim 1, wherein the interface identifier comprises at least one of a network device address, a service group identifier, and node characteristics associated with the endpoint device.

3. The method of claim 1, wherein the network system is a cable network system and each of the plurality of endpoint devices is a customer premises equipment.

4. The method of claim 1, wherein the address request is an IPv6 DHCP request.

5. A non-transitory computer readable medium comprising instructions, the instructions comprising:
   a prefix delegation component configured to delegate a prefix in response to a received dynamic host configuration protocol (DHCP) request that includes an interface identifier associated with a network topology of a respective one of a plurality of customer premises equipment (CPE) devices having a common network topology, the delegated prefix corresponding to a subnet assignment for the respective one of the plurality of CPE devices based on the interface identifier in the address request; and
   a routing update component configured to configured to identify the common network topology based on the interface identifier in each of a plurality of address requests provided from each of the respective plurality of CPE devices and to set a route aggregation scheme for data routed to the plurality of CPE devices based on the common network topology wherein the plurality of CPE devices are coupled to one of a plurality of termination systems, each of the plurality of termination systems being coupled to a plurality of CPE devices that are each associated with a given service group, wherein the routing update component is configured to;
   provide the route aggregation scheme to an aggregation router configured to maintain aggregation routing tables for routing data to the plurality of the CPE device in each of the plurality of termination systems in a scalable manner,
   determine if at least one of the CPE devices have moved from a first of the plurality of termination systems to a second of the plurality of termination systems based on delegating the prefix and based on the received address request, and
   set a route aggregation scheme for the delegated prefix and to provide the route aggregation scheme to the aggregation router and to the plurality of termination systems, the aggregation router being configured to update the aggregation routing tables based on the route aggregation scheme.

6. The medium of claim 5, wherein the interface identifier comprises at least one of a network device address associated with the CPE device and a service group identifier associated with the CPE device.

7. A method comprising:
   receiving an address request that is generated at an endpoint device in a network system, the address request comprising an interface identifier associated with a network topology of the endpoint device, wherein receiving the address request comprises receiving the address request from one of a plurality of termination systems, each of the plurality of termination systems being coupled to a plurality of endpoint devices that are each associated with a given service group;
   delegating a prefix for the endpoint device in response to the address request, the delegated prefix corresponding to a subnet assignment for the CPE device based on the interface identifier in the address request;
   transmitting the prefix to the endpoint device in a response packet;

setting a route aggregation scheme for data routed to the endpoint device based on the delegated prefix, wherein setting the route aggregation scheme comprises;

setting the route aggregation scheme at a provisioning system for data routed to the plurality of endpoint devices based on a prefix that is delegated to each of the plurality of termination systems, determining if at least one of the plurality of endpoint devices have moved from a first of the plurality of termination systems to a second of the plurality of termination systems based on delegating the prefix and based on the respective received address request, setting the route aggregation scheme for the delegated prefix, and providing the route aggregation scheme to the aggregation router and to the plurality of termination systems for an update of respective routing tables;

generating a specific route scheme associated with the delegated prefix in response to determining that less than all of the plurality of endpoint devices have moved from the first of the plurality of termination systems to the second of the plurality of termination systems; and providing the specific route scheme to the aggregation router and to the plurality of termination systems.

8. The method of claim 7, wherein the interface identifier comprises at least one of a network device address, a service group identifier, and node characteristics associated with the endpoint device.

9. The method of claim 7, wherein the network system is a cable network system and each of the plurality of endpoint devices is a customer premises equipment.

10. The method of claim 7, wherein the address request is an IPv6 DHCP request.

* * * * *